US009372500B2

(12) United States Patent
Goyal et al.

(10) Patent No.: US 9,372,500 B2
(45) Date of Patent: Jun. 21, 2016

(54) GENERATING A TIMEOUT SIGNAL BASED ON A CLOCK COUNTER ASSOCIATED WITH A DATA REQUEST

(71) Applicant: APPLIED MICRO CIRCUITS CORPORATION, Sunnyvale, CA (US)

(72) Inventors: Ayush Goyal, Dublin, CA (US); Phil Mitchell, San Jose, CA (US)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 161 days.

(21) Appl. No.: 14/191,923

(22) Filed: Feb. 27, 2014

(65) Prior Publication Data

US 2015/0323956 A1    Nov. 12, 2015

(51) Int. Cl.
*H04L 1/00*    (2006.01)
*G06F 15/173*    (2006.01)
*G06F 1/04*    (2006.01)

(52) U.S. Cl.
CPC ........................................ *G06F 1/04* (2013.01)

(58) Field of Classification Search
CPC .................................................. G06F 1/3203
USPC ......................................................... 713/600
See application file for complete search history.

(56) References Cited

U.S. PATENT DOCUMENTS

| 6,496,890 | B1  | 12/2002 | Azevedo et al. |
| 6,961,900 | B1* | 11/2005 | Sprague et al. ............... 715/202 |
| 7,590,881 | B2* | 9/2009  | Cormier ........................ 713/600 |
| 7,640,314 | B2* | 12/2009 | Kojima .......................... 709/208 |
| 7,916,633 | B2* | 3/2011  | McGregor .................... 370/230 |
| 8,315,830 | B2  | 11/2012 | Martin et al. |
| 8,370,556 | B2  | 2/2013  | Sakugawa |
| 8,379,658 | B2  | 2/2013  | Schmidt et al. |
| 8,490,064 | B2  | 7/2013  | Shrivastava et al. |
| 8,607,241 | B2  | 12/2013 | Saha et al. |
| 2008/0235420 | A1 | 9/2008  | Wei |
| 2009/0024726 | A1* | 1/2009  | Jeon et al. ..................... 709/223 |
| 2010/0153602 | A1 | 6/2010  | Kume et al. |
| 2010/0180162 | A1 | 7/2010  | Cardwell et al. |

FOREIGN PATENT DOCUMENTS

WO    03-050691    6/2003

OTHER PUBLICATIONS

International Search Report for International Patent Application No. PCT/US2015/042592 dated Apr. 29, 2016, 3 pages.
Written Opinion for International Patent Application No. PCT/US2015/042592 dated Apr. 29, 2016, 7 pages.

\* cited by examiner

*Primary Examiner* — Suresh Suryawanshi
(74) *Attorney, Agent, or Firm* — Amin, Turocy & Watson LLP

(57) ABSTRACT

Various aspects provide for generating a timeout signal based on a clock counter associated with a data request. An interface component is configured for receiving a data request from a master device and forwarding the data request to a slave device. A timeout component is configured for maintaining a clock counter associated with the data request and generating a timeout signal in response to a determination that a threshold level associated with the clock counter is reached before receiving a data response associated with the data request from the slave device.

20 Claims, 13 Drawing Sheets

GENERATING A TIMEOUT SIGNAL BASED ON A CLOCK COUNTER ASSOCIATED WITH A DATA REQUEST

TECHNICAL FIELD

The subject disclosure relates generally to data transactions between devices, and more particularly to generating a timeout signal based on a clock counter associated with a data request.

BACKGROUND

In a network system, numerous master devices (e.g., primary devices) can be connected to a slave device (e.g., a secondary device) via a bus. For example, the master devices can initiate data transactions with the slave device. Furthermore, the master devices can control the slave device and/or processes associated with the slave device. As such, data transactions can be transmitted and/or received between master devices and a slave device. In an example, a particular master device can send a data request to a slave device. As such, a slave device can send a data response to a particular master device in response to receiving a data request. However, in certain instances, a slave device may be unable to send a data response to a particular master device (e.g., due to device failure, etc.). As such, a network hang (e.g., a network freeze, a system bus hang, a system bus freeze, etc.) can occur in the network system.

The above-described description is merely intended to provide a contextual overview of current techniques for facilitating data transactions between devices in a network and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises an interface component and a timeout component. The interface component is configured for receiving a data request from a master device and forwarding the data request to a slave device. The timeout component is configured for maintaining a clock counter associated with the data request. The timeout component is also configured for generating a timeout signal in response to a determination that a threshold level associated with the clock counter is reached before receiving a data response associated with the data request from the slave device.

In another example embodiment, a method comprises receiving a data request in a computer system from a master device. The method also comprises forwarding the data request to a slave device. The method also comprises maintaining a clock counter associated with the data request in the computer system. The method also comprises generating a timeout signal in the computer system in response to a determination that a threshold level associated with the clock counter is reached before receiving a data response associated with the data request from the slave device.

In yet another example embodiment, a system includes a means for receiving a data request from a master device. The system also includes a means for forwarding the data request to a slave device. The system also includes a means for maintaining a clock counter associated with the data request. The system also includes a means for generating a timeout signal in response to a determination that a threshold level associated with the clock counter is reached before receiving a data response associated with the data request from the slave device.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
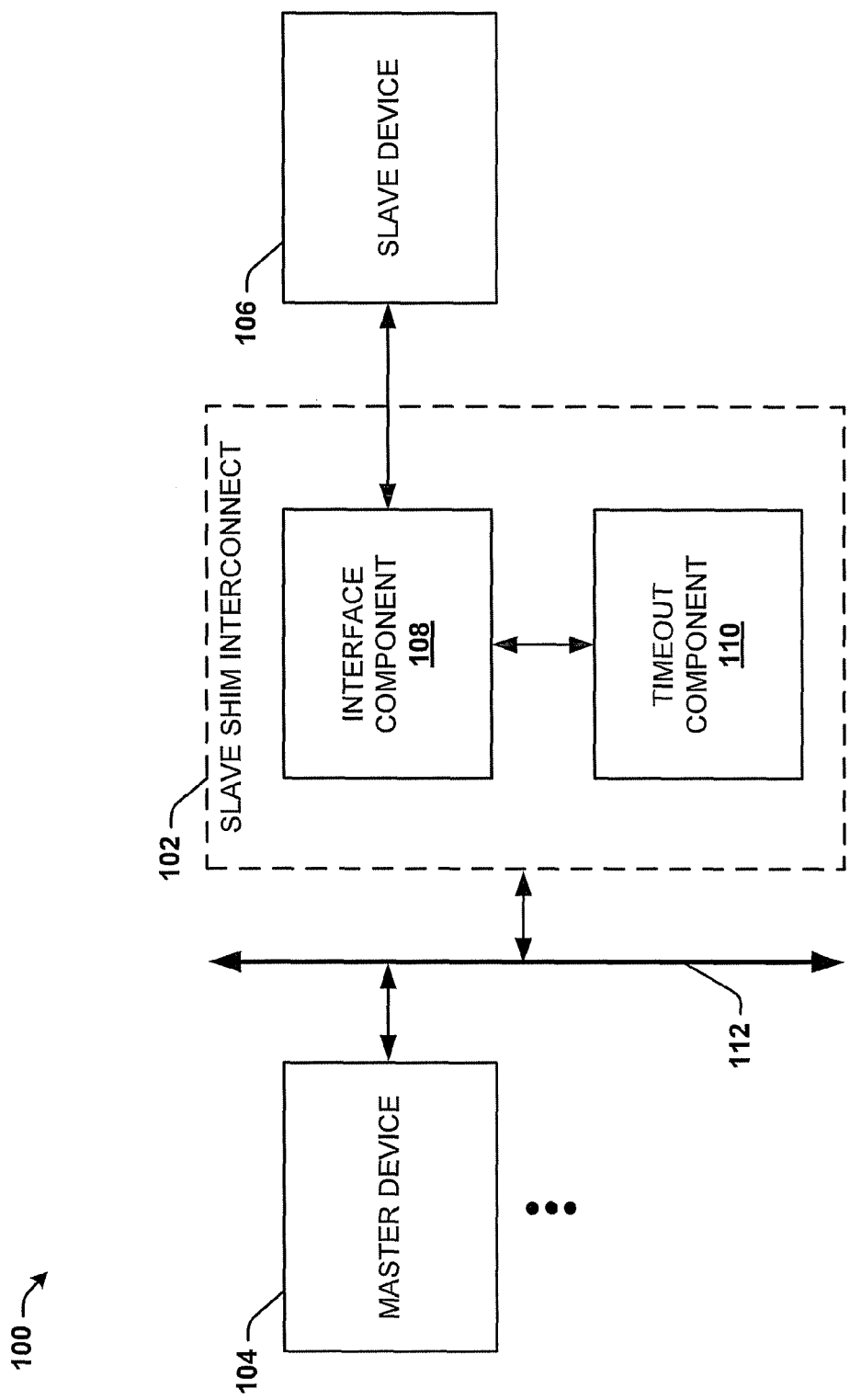
FIG. 1 is a block diagram illustrating an example, non-limiting embodiment of a network system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure facilitate a timeout mechanism for data transactions (e.g., data requests and/or data responses) based on a clock counter associated with the data transactions. For example, one or more data responses can be generated on behalf of a slave device when the slave device is unable to generate the one or more data responses (e.g., due to a slave device failure). In an aspect, a timeout mechanism can be implemented to facilitate generation of one or more data responses on behalf of a slave device when the slave device is unable to generate the one or more data responses. In one example, a timeout mechanism can be associated with a clock counter (e.g., a timer). As such, a data response can be guaranteed for each data request generated by a master device. Therefore, a network hang (e.g., a network freeze, a system bus hang, a system bus freeze, etc.) can be avoided. Accordingly, resetting of a network system due to a network hang can be avoided. Furthermore, other slave devices can continue to receive data requests and/or send data responses via the system bus.

Turning now to FIG. 1, a block diagram illustrating an example, non-limiting embodiment of a system 100 in accordance with various aspects described herein is shown. System 100 includes a slave shim interconnect 102, at least one master device (e.g., primary device) 104 and a slave device (e.g., secondary device) 106. For example, the at least one master device 104 and the slave device 106 can be coupled via a bus (e.g., a system bus) 112. As such, one or more master devices can be in communication with the slave shim interconnect 102 via the bus 112. It is to be appreciated that the system 100 can include a slave shim interconnect for each slave device in the system 100 (e.g., the system 100 can include more than one slave shim interconnect and/or more than one slave device). The slave shim interconnect 102 can include at least an interface component 108 and a timeout component 110. The system 100 can be employed by various systems, such as, but not limited to server systems, high availability server systems (e.g., Telecom server systems), Web server systems, file server systems, media server systems, network systems, TCP network systems, Internet network systems, data center systems, communication systems, router systems, disk array systems, powered insertion board systems, and the like.

In an aspect, the slave shim interconnect 102 can be implemented as an interconnect layer of the slave device 106. For example, the slave shim interconnect 102 can be implemented between a first interface of the slave device 106 (e.g., a bus-side interface) and a second interface of the slave device 106 (e.g., a device-side interface). In another aspect, the slave shim interconnect 102 can be implemented separate from the slave device 106. For example, the slave shim interconnect 102 can be coupled to and/or in communication with the slave device 106. In an aspect, the master device 104 can be implemented as a central processing unit. However, it is to be appreciated that the master device 104 can be implemented as a different type of device. In an aspect, the slave device 106 can be a network device (e.g., a server device). For example, the slave device 106 can be implemented as a peripheral component interconnect (PCI) device. However, it is to be appreciated that the slave device 106 can be implemented as a different type of network device. In another aspect, the slave device 106 can be a storage device. For example, the slave device can be implemented as a serial advanced technology attachment (SATA) device. However, it is to be appreciated that the slave device 106 can be implemented as a different type of storage device.

The slave shim interconnect 102 (e.g., the interface component 108) can be configured to receive one or more data requests from the master device 104 (e.g., via a bus 112). For example, the slave shim interconnect 102 (e.g., the interface component 108) can be configured to receive one or more read requests from the master device 104. Additionally or alternatively, the slave shim interconnect 102 (e.g., the interface component 108) can be configured to receive one or more write requests from the master device 104. In an aspect, the one or more data requests can be Advanced eXtensible Interface (A)(I) data requests.

Furthermore, slave shim interconnect 102 (e.g., the interface component 108) can be configured to send (e.g., forward) the one or more data requests (e.g., the one or more data requests received from the master device 104) to the slave device 106. In an aspect, the slave shim interconnect 102 can receive and/or send (e.g., forward) a single data request. In another aspect, the slave shim interconnect 102 can receive and/or send (e.g., forward) a group of data requests. As such, the slave shim interconnect 102 can be an interconnect device (e.g., an intermediary device) for data transmissions between the master device 104 and the slave device 106.

The interface component 108 can be configured to monitor data transactions (e.g., data requests and/or data responses) between the master device 104 and the slave device 106. In an aspect, the interface component 108 can be configured to monitor data transactions between the master device 104 and the slave device 106 based at least in part on a timeout mechanism (e.g., a clock counter, a timer, etc.) associated with the timeout component 110. For example, the timeout component 110 can implement at least one clock counter (e.g., at least one timer) associated with a data request received from the master device 104 and/or sent to (e.g., forwarded to) the slave device 106. In an aspect, the timeout component 110 can implement a clock counter for each data request received by the interface component 108. As such, the timeout component 110 can maintain a plurality of clock counters corresponding to a total number of data requests received from the at least one master device 104.

Therefore, in an aspect, the interface component 108 can receive a data request from the master device 104 and/or forward the data request to the slave device 106. Furthermore, the timeout component 110 can maintain a clock counter associated with the data request. In an aspect, the timeout component 110 can generate a timeout signal (e.g., an error response signal) in response to a determination that a threshold level associated with the clock counter is reached (e.g., a timer has expired) before receiving a data response associated with the data request from the slave device 106. The threshold level can correspond to a predetermined period of time since the forwarding of the data request to the slave device 106. As such, the interface component 108 can detect a timeout signal and/or generate an error response associated with a data request. In an aspect, the clock counter implemented by the timeout component 110 can be triggered by a signal (e.g., a periodic 'tick' signal). For example, the clock counter implemented by the timeout component 110 (e.g., a timeout field associated with the data request) can be incremented by one (e.g., a single value) based on the signal. In an aspect, the threshold level can be associated with a hexadecimal value (e.g., 0xFF, etc.). However, it is to be appreciated that the threshold value can be associated with a different type of value. Accordingly, the clock counter implemented by the timeout component 110 (e.g., a timeout field associated with the data request) can be incremented by a single hexadecimal value based on the signal.

In an aspect, the interface component 108 can be configured to send a proxy data response associated with the data request to the master device 104 as a function of the at least one clock counter (e.g., the timeout mechanism) associated with the timeout component 110. For example, the interface component 108 can be configured to send a proxy data response to the master device 104 in response to receiving the timeout signal from the timeout component 110 (e.g., in response to a determination that the master device 104 has not received a data response associated with the data request from the slave device 106 within a predetermined time period). As such, the interface component 108 can send a proxy data response to the master device 104 on behalf of the slave device 106 in response to a determination that the master device 104 has not received a data response (e.g., a data response associated with the data request generated by the master device 104) from the slave device 106 within a predetermined time period. In an aspect, the predetermined time period can be programmable and/or configurable. In one example, the predetermined period of time can be determined based on information associated with the slave device 106. Additionally or alternatively, the predetermined period of time can be determined based on information associated with the master device 104 that generated the data request. Additionally or alternatively, the predetermined period of time can be determined based on information associated with the data request. As such, a predetermined period of time associated with a particular data request can be different than a predetermined period of time associated with a different data request (e.g., a predetermined period of time can be uniquely determined for each data request). In another example, the predetermined period of time can be determined and/or configured by a user (e.g., user input). Accordingly, greater flexibility can be provided by allowing timeout values (e.g., predetermined time periods) to vary for different slave interfaces.

Furthermore, the interface component 108 and/or the timeout component 110 can be configured to handle one or more other data requests (e.g., future data requests) associated with the slave device 106 in response to the receiving the timeout signal from the timeout component. For example, the interface component 108 can receive one or more other data requests (e.g., after the initial data request) from the master device 104 and/or send one or more other data responses (e.g., after the proxy data response) to the master device 104 on behalf of the slave device 106 in response to the determination that the master device 104 has not received a data response associated with the data request from the slave device 106 within a predetermined time period. As such, the interface component 108 and/or the timeout component 110 can take-over (e.g., manage, control, etc.) any impending data requests and/or data responses for the slave device 106 after the proxy data response is sent to the master device 104 (e.g., in response a clock counter associated with a data request reaching a threshold value, in response a timer associated with a data request expiring, in response to a timeout signal being generated, etc.). In an aspect, a data response and/or a proxy data response can be an AXI data response. In another aspect, the interface component 108 can send a data response and/or a proxy data response according to a set of ordering rules (e.g., a set of AXI ordering rules).

In an aspect, the interface component 108 can forward a data response associated with the data request to the master device 104 in response to receiving the data response from the slave device 106 and not receiving the timeout signal from the timeout component 110. For example, if a data response associated with the data request is generated by the slave device 106 within the predetermined period of time (e.g., before the clock counter reaches the predetermined threshold value, before the timer expires, etc.), the interface component 108 can forward the data response to the mater device 104. Accordingly, the interface component 108 can forward a data response to the master device 104 instead of generating and/or sending a proxy data response.

In another aspect, the interface component 108 can be configured to store a transaction identification (ID) associated with the data request. For example, the interface component 108 can store a transaction ID associated with the data request in response to receiving the data request from the master device 104 and/or in response to sending (e.g., forwarding) the data request to the slave device 106. Additionally or alternatively, the interface component 108 can be configured to store information associated with the transaction ID and/or the data request. For example, the information associated with the transaction ID and/or the data request can include, but is not limited to, a tag (e.g., an input/output bride request tag), information associated with length of the data request, a register request flag (e.g., a flag that indicates whether the data request is a register request), a control or status register request flag (e.g., a CSR request flag), a timeout count associated with the data request (e.g., a clock counter value associated with the data request), information regarding other data requests associated with the transaction ID, and/or other information associated with the transaction ID and/or the data request.

As such, the interface component 108 and/or the timeout component 110 can determine whether a data response and/or a proxy data response associated with a particular data request has been sent to the master device 104 based on a corresponding transaction ID (e.g., associated with the data request) stored by the interface component 108. In another aspect, the interface component 108 can be configured to manage stored transactions IDs. In one example, the interface component 108 can be configured to delete the transaction ID associated with the data request in response to receiving the data response associated with the data request from the slave device 106. In another example, the interface component 108 can be configured to delete the transaction ID associated with the data request in response to the sending of the proxy data response associated with the data request. In an aspect, the interface component 108 can append a transaction ID for a data request to a corresponding data response and/or a corresponding proxy data response. For example, the interface component 108 can be configured to associate a transaction ID associated, with a data request with a corresponding data response and/or a corresponding proxy data response (e.g., a corresponding data response and/or a corresponding proxy data response can comprise a transaction ID for the data request).

Therefore, the interface component 108 can determine whether to send a proxy data response associated with a data request based at least in part on a transaction ID stored and/or deleted by the interface component 108. In an aspect, the timeout component 110 can be configured to manage and/or update clock counters (e.g., timers) associated with data requests. For example, the timeout component 110 can stop and/or delete (e.g., remove) a clock counter (e.g., a timer) associated with a data request in response to a corresponding data response and/or a corresponding proxy data response being sent to the master device 104.

In an aspect, the timeout component 110 can periodically scan for transaction IDs that have not received a response from the slave device 106. Therefore, when a response for a pending data request has not been received within a predetermined period of time (e.g., a predetermined window of time), the timeout component 110 can generate a timeout signal. In another aspect, when a response for a pending data request has not been received within a predetermined period of time (e.g., a predetermined window of time), an interface associated with the slave device 106 can be disabled.

Figure 2:
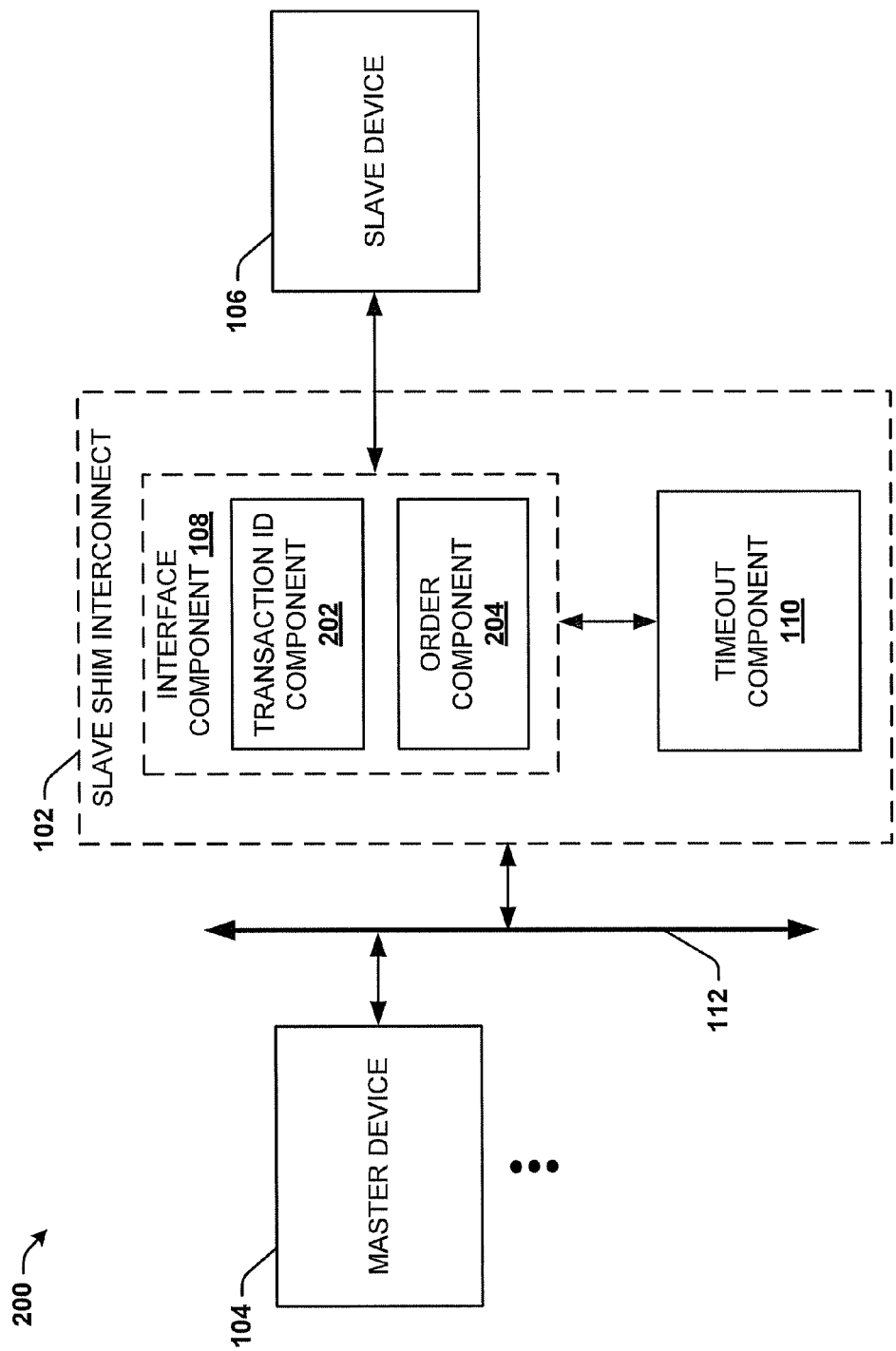
FIG. 2 is a block diagram illustrating another example, non-limiting embodiment of a network system in accordance with various aspects described herein.

Referring now to FIG. 2, a block diagram illustrating an example, non-limiting embodiment of a system 200 in accordance with various aspects described herein is shown. System 200 includes the slave shim interconnect 102, the at least one master device 104 and the slave device 106. The slave shim interconnect 102 can include at least the interface component 108 and the timeout component 110. The interface component 108 can include a transaction identification (ID) component 202 and/or an order component 204.

The transaction ID component 202 can maintain (e.g., store) a transaction ID for each data request received by the master device 104 in a data structure (e.g., a storage device, a data store, etc.). For example, the transaction ID component 202 can maintain (e.g., store) transaction IDs that are associated with pending data requests. In an aspect, the transaction ID component 202 can be implemented as and/or associated with a first-in-first-out (FIFO) data structure. In another aspect, the transaction ID component 202 can be associated with a content-addressable memory. In yet another aspect, the transaction ID component 202 can maintain (e.g., store) a transaction ID for each data request in a linked list data structure. In one example, a transaction ID stored in the data structure can be associated with a single data request. In another example, a transaction ID stored in the data structure can be associated with more than one data request. For example, an entry in the data structure for a transaction ID (e.g., an entry for a data list in a linked list data structure) can be configured based on ordering of data requests to be processed. Accordingly, the transaction ID component 202 (e.g., a linked list data structure implemented in and/or associated with the transaction ID component 202) can be configured to track pending data requests associated with the slave device 106. For example, a data response and/or a proxy data response for a pending data request can be generated based at least in part on a determination that the pending data request is a next data request to be processed in a linked list data structure (e.g., in a data list of the linked list data structure). As such, the transaction ID component 202 can facilitate management of data request(s) associated with each transaction ID (e.g., ordering of data request(s) associated with each transaction ID, tracking of pending data request(s) associated with each transaction ID, etc.).

In an aspect, the transaction ID component 202 can include and/or be associated with one or more data structures to support ordering of data requests. For example, a first data structure can store transaction IDs associated with pending data requests, a second data structure can include an index of the first data structure (e.g., hit or miss information for each transaction ID), a third data structure can store information associated with pending data requests, a fourth data structure can store output information for a next pending data request, a fifth data structure can store information for a next data request that requires a data response in each linked list of transaction IDs, a sixth data structure can store information for a last data request that requires a data response in each linked list of transaction IDs, a seventh data structure can include an array of buffers for storing information associated with each pending data request, etc.

The order component 204 can be configured to manage received data requests. Additionally or alternatively, the order component 204 can be configured to manage sending of data responses and/or proxy data responses. In an example, the order component 204 can manage sending of data responses and/or proxy data responses based at least in part on transaction IDs stored in the transaction ID component 202. Additionally or alternatively, the order component 204 can be configured to monitor and/or receive timeout signals associated with the timeout component 110. For example, the order component 204 can be configured to receive and/or store data requests (e.g., determine whether to process data requests on behalf of the slave device 106) based on timeout signals generated by the timeout component 110. Additionally or alternatively, the order component 204 can generate data responses and/or proxy data responses (e.g., determine whether to send a data response and/or a proxy data response for a particular data request) based on timeout signals generated by the timeout component 110.

Additionally or alternatively, the order component 204 can be configured to manage stored transaction IDs. In an aspect, the order component 204 can update and/or delete stored transaction IDs. For example, the order component 204 can associate a transaction ID for a data request with a corresponding data response. In another example, the order component 204 can associate a transaction ID for a data request with a corresponding proxy data response. In an aspect, the order component 204 can delete a transaction ID associated with the transaction ID component 202 in response to being associated with a data response and/or a proxy data response. As such, the order component 204 can manage transaction IDs associated with data transactions (e.g., data requests and/or data responses associated with the transaction ID component 202).

In an aspect, the order component 204 can process a data request associated with a first transaction ID and/or a data response associated with a second transaction ID per clock cycle. For example, during each clock cycle, the order component 204 can process a data request associated with a particular transaction ID and/or a data response associated with a different transaction ID. In another aspect, in response to an ID collision during a particular clock cycle, the order component 204 can process a data response associated with a particular transaction ID before a data request associated with the particular transaction ID.

Figure 3:
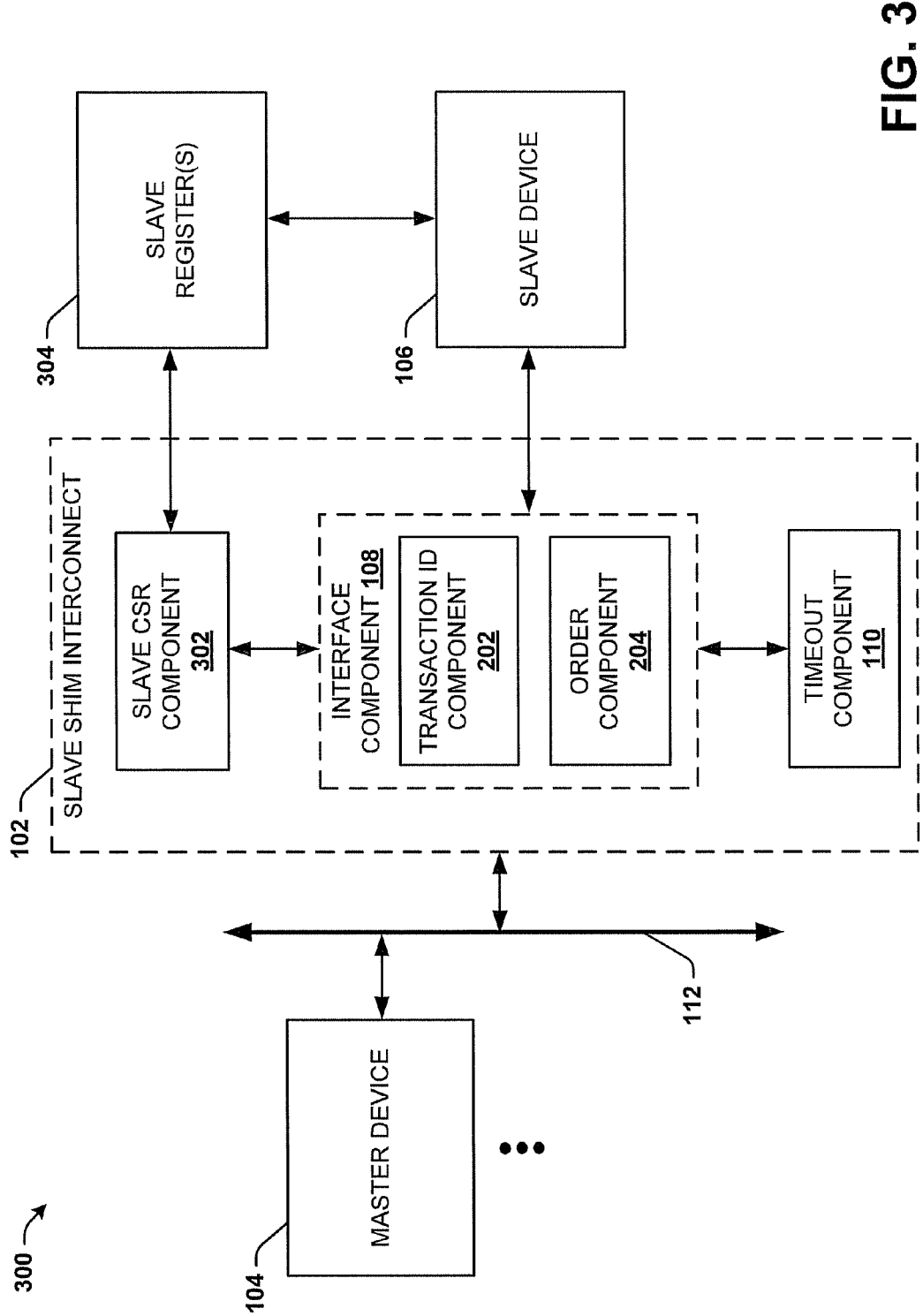
FIG. 3 is a block diagram illustrating yet another example, non-limiting embodiment of a network system in accordance with various aspects described herein.

Referring now to FIG. 3, a block diagram illustrating an example, non-limiting embodiment of a system 300 in accordance with various aspects described herein is shown. System 300 includes the slave shim interconnect 102, the at least one master device 104 and the slave device 106. The slave shim interconnect 102 can include at least the interface component 108, the timeout component 110 and a slave control status register (CSR) component 302. The interface component 108 can include the transaction ID component 202 and/or the order component 204.

The slave CSR component 302 can be configured to receive one or more data requests and/or send one or more data responses associated with the slave register(s) 304 (e.g., at least one CSR register associated with the slave device 106). For example, the master device 104 can generate one or more register data requests that can be received by the slave CSR component 302. Additionally, the slave CSR component 302 can send (e.g. forward) the one or more register data requests to the slave register(s) 304. Additionally, the slave CSR component 302 can send (e.g., forward) one or more register data responses received from the slave register(s) 304. For example, the slave CSR component 302 can send (e.g., forward) one or more register data responses to the master device 104.

In an aspect, the slave CSR component 302 can send a proxy register data response to the master device 104 in response to a determination that the master device 104 has not received a register data response associated with the register data request from the register(s) 304 within a predetermined time period. In an aspect, the predetermined time period can be programmable and/or configurable. In one example, a value of the predetermined period of time can be determined based on information associated with the slave device 106 and/or the slave register(s) 304. As such, the predetermined period of time can be varied based on a particular implementation of the slave device 106 and/or the slave register(s) 304. Additionally or alternatively, a value of the predetermined period of time can be determined based on information associated with the master device 104. As such, a predetermined period of time for a particular master device 104 can be different than a predetermined period of time for another master device 104 (e.g., a predetermined time period associated with a register data request can be uniquely determined). In an aspect, a clock counter associated with the register data request can be maintained by the timer component 110 and/or the slave CSR component 302. Additionally, the timer component 110 and/or the slave CSR component 302 can generate a CSR timeout signal in response to a determination that a threshold level associated with the clock counter is reached before receiving a register data response associated with the register data request. As such, the slave CSR component 302 can be configured for sending a proxy register data response to the master device 104 in response to generating and/or receiving the CSR timeout signal.

In an aspect, the slave CSR component 302 can send and/or receive one or more register data transactions associated with the slave register(s) 304 after a timeout signal associated with the slave device 106 is received from the timeout component 110. As such, register data transactions associated with the slave register(s) 304 can continue after a slave device 106 is determined to be unresponsive.

In another aspect, the clock counter implemented by the timeout component 110 can be triggered by a signal (e.g., a periodic 'tick' signal) generated by the slave CSR component 302 and/or the slave register(s) 304. For example, the clock counter implemented by the timeout component 110 (e.g., a timeout field associated with the data request) can be incremented based on the signal generated by the slave CSR component 302 and/or the slave register(s) 304. In an aspect, a threshold level associated with the clock counter can be associated with a hexadecimal value (e.g., 0xFF). However, it is to be appreciated that the threshold value can be associated with a different type of value. Accordingly, the clock counter implemented by the timeout component 110 (e.g., a timeout field associated with the data request) can be incremented by a single hexadecimal value based on the signal generated by the slave CSR component 302 and/or the slave register(s) 304. In another aspect, the signal generated by the slave CSR component 302 and/or the slave register(s) 304 can be implemented by a clock counter for each pending data request. For example, a clock counter for each pending data request can be updated based on the signal generated by the slave CSR component 302 and/or the slave register(s) 304.

Figure 4:
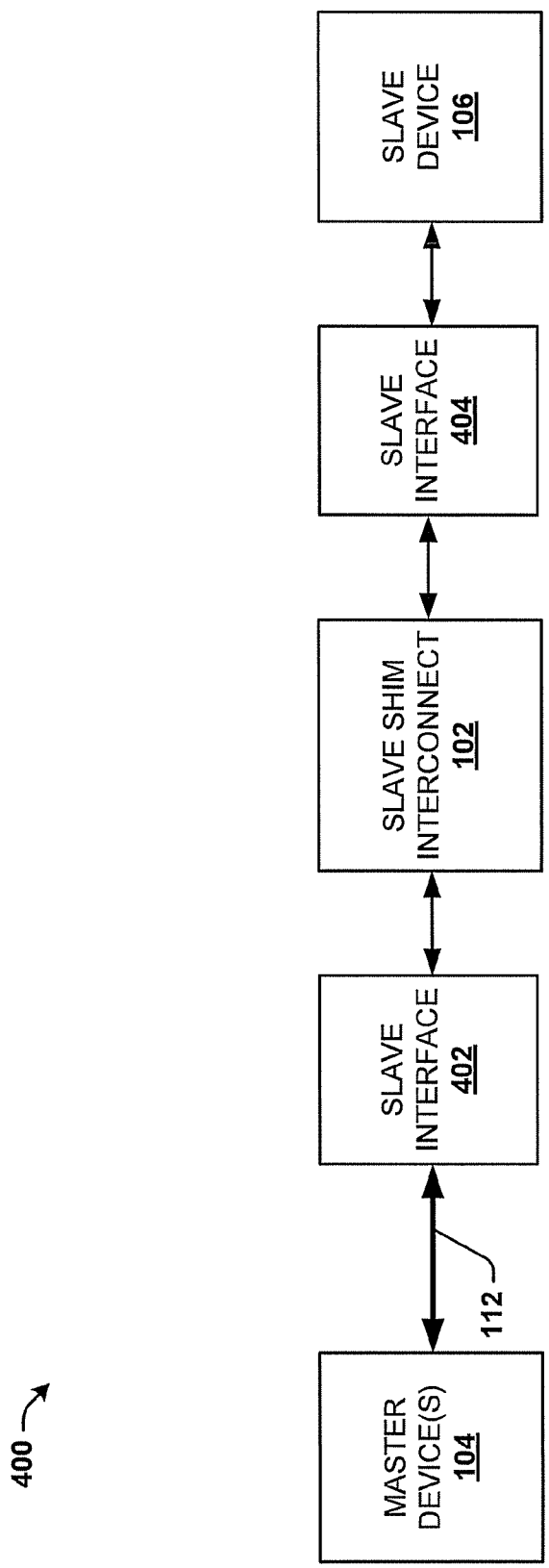
FIG. 4 is a block diagram illustrating a slave shim interconnect within a network system in accordance with various aspects described herein.

Referring now to FIG. 4, a block diagram illustrating an example, non-limiting embodiment of a system 400 in accordance with various aspects described herein is shown. System 400 includes the slave shim interconnect 102, the at least one master device 104, the slave device 106, a slave interface 402 and a slave interface 404. In aspect, the slave interface 402 can be implemented as a bus-side slave interface. In another aspect, the slave interface 404 can be implemented as a device-side slave interface.

The slave interface 402 can be implemented between the at least one master device 104 and the slave shim interconnect 102. For example, the slave interface 402 can receive data requests from the at least one master device 104 and/or send data responses to the at least one master device 104 via the bus 112. The slave shim interconnect 102 can be implemented between the slave interface 402 and the slave interface 404. The slave interface 404 can be implemented between the slave shim interconnect 102 and the slave device 106. In an aspect, the slave interface 402 and/or the slave interface 404 can be an AXI slave interface.

In an aspect, the slave interface 402 and/or the slave interface 404 can be configured to receive and/or store incoming data requests while outgoing data responses are being processed. For example, the slave interface 402 and/or the slave interface 404 can implement and/or be associated with one or more FIFO memories to receive and/or store incoming data request while outgoing data responses are being processed. In one example, the slave interface 402 and/or the slave interface 404 can implement data flow control (e.g. data request and/or data response flow control) in response to the one or more FIFO memories being full. In another aspect, the slave interface 402 and/or the slave interface 404 can be configured to receive and/or store outgoing data responses while incoming data requests are being processed. For example, the slave interface 402 and/or the slave interface 404 can implement and/or be associated with a FIFO memory (e.g., a different FIFO memory) to receive and/or store outgoing data responses while incoming data requests are being processed. In an aspect, the slave interface 404 can be disabled in response to a timeout signal associated with the slave device 106 being generated.

Figure 5:
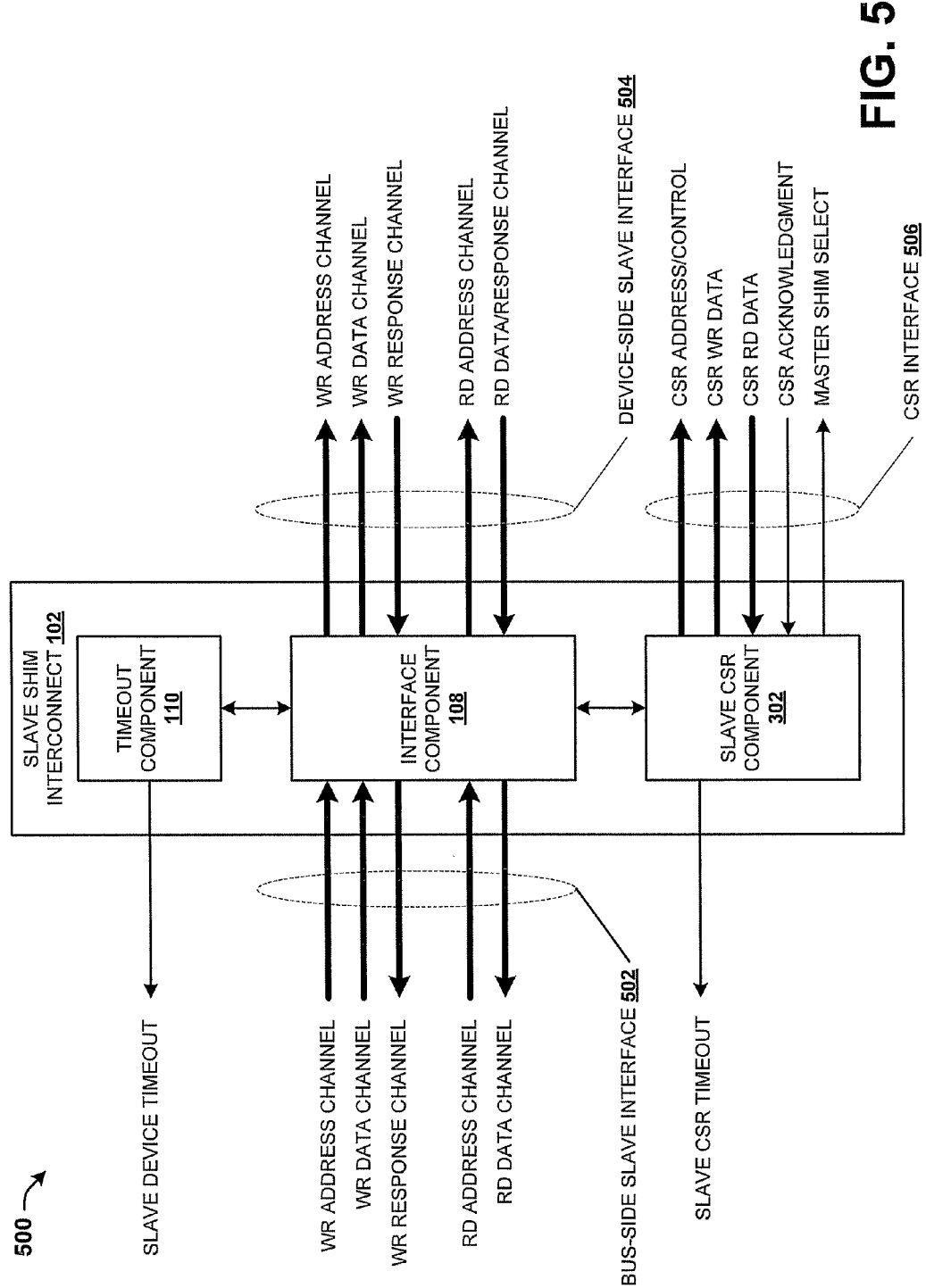
FIG. 5 is a block diagram illustrating data transaction signals in connection with a slave shim interconnect in accordance with various aspects described herein.

Referring now to FIG. 5, a block diagram illustrating an example, non-limiting embodiment of a system 500 in accordance with various aspects described herein is shown. System 500 includes the slave shim interconnect 102. The slave shim interconnect 102 can include at least the interface component 108, the timeout component 110 and the slave CSR component 302. The interface component 108 can include the transaction ID component 202 and/or the order component 204.

The slave shim interconnect 102 can be coupled to the at least one master device 104 and/or the slave device 106. For example, the interface component 108 can receive a write (wr) address channel signal, a write data channel signal and/or a read (rd) address channel signal from the at least one master device 104. Additionally or alternatively, the interface component 108 can send a write response channel signal and/or a read data channel signal to the at least one master device 104. Additionally or alternatively, the interface component 108 can send a write address channel signal, a write data channel signal and/or a read address channel signal to the slave device 106. Additionally or alternatively, the interface component 108 can receive a write response channel signal and/or a read data/response channel signal from the slave device 106. Additionally or alternatively, the slave CSR component 302 can send a CSR address/control signal, a CSR write data signal and/or a master shim select signal. Additionally or alternatively, the slave CSR component 302 can receive a CSR read data signal and/or a CSR acknowledgment signal. Additionally or alternatively, the timeout component 110 can generate a slave device timeout signal. Additionally or alternatively, the slave CSR component 302 can generate a slave CSR timeout signal.

In an aspect, signals can be received from the at least one master device 104 via a bus-side slave interface 502 (e.g., the slave interface 402) and/or sent to the at least one master device 104 via the bus-side slave interface 502 (e.g., the slave interface 402). In another aspect, signals can be received from the slave device 106 via a device-side slave interface 504 (e.g., the interface 404) and/or sent to the slave device 106 via the device-side slave interface 504 (e.g., the interface 404). In yet another aspect, signals can be received from the slave register(s) 302 via a CSR slave interface 506 and/or sent to the slave register(s) 302 via the CSR slave interface 506. As such, the interface component 108 can be configured to manage data transactions (e.g., signals) associated with the bus-side slave interface 502 and/or the device-side slave interface 504, as more fully disclosed herein. Furthermore, the slave CSR component 302 can be configured to manage register data transactions (e.g., signals) associated with the CSR interface 506, as more fully disclosed herein In view of the example systems described above, methods that may be implemented in accordance with the described subject matter may be better appreciated with reference to the flow charts of FIGS. 6-11. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
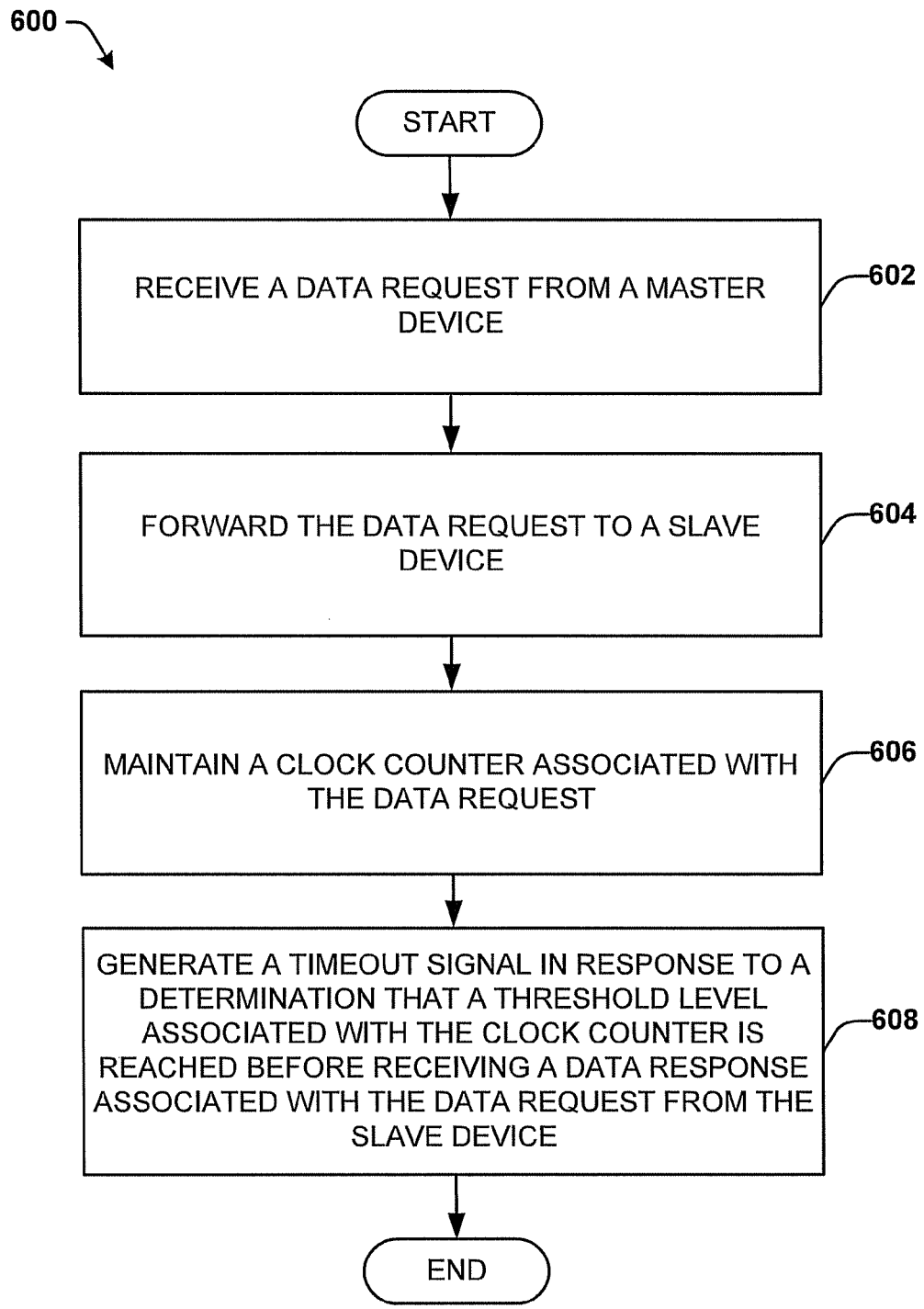
FIG. 6 illustrates a flow diagram of an example, non-limiting embodiment of a method for generating a timeout signal based on a clock counter associated with a data request in accordance with various aspects described herein.

Referring to FIG. 6, a flow diagram of an example, non-limiting embodiment of a method for generating a timeout signal based on a clock counter associated with a data request is shown. Method 600 can begin at block 602, where a data request is received from a master device (e.g., by an interface component 108). In one example, a write request can be received from a master device. In another example, a read request can be received from a master device. In an aspect, the data request can be received as a single data request from the master device. In another aspect, the data request can be included in a group of data requests received from the master device.

At block 604, the data request is forwarded (e.g., by an interface component 108) to a slave device. For example, the data request received by the master device can be sent to the slave device.

At block 606, a clock counter associated with the data request is maintained (e.g., by a timeout component 110). For example, a clock counter (e.g., a timer) associated with the data request can be generated, configured and/or maintained in response to receiving the data request from the master device and/or forwarding the data request to the slave device.

At block 608, a timeout signal is generated (e.g., by a timeout component 110) in response to a determination that a threshold level associated with the clock counter is reached before receiving a data response associated with the data request from the slave device. For example, a timeout signal can be generated in response to a determination that a predetermined period of time has passed since the data request was forwarded to the slave device (e.g., without receiving a data response from the slave device within the predetermined period of time).

Figure 7:
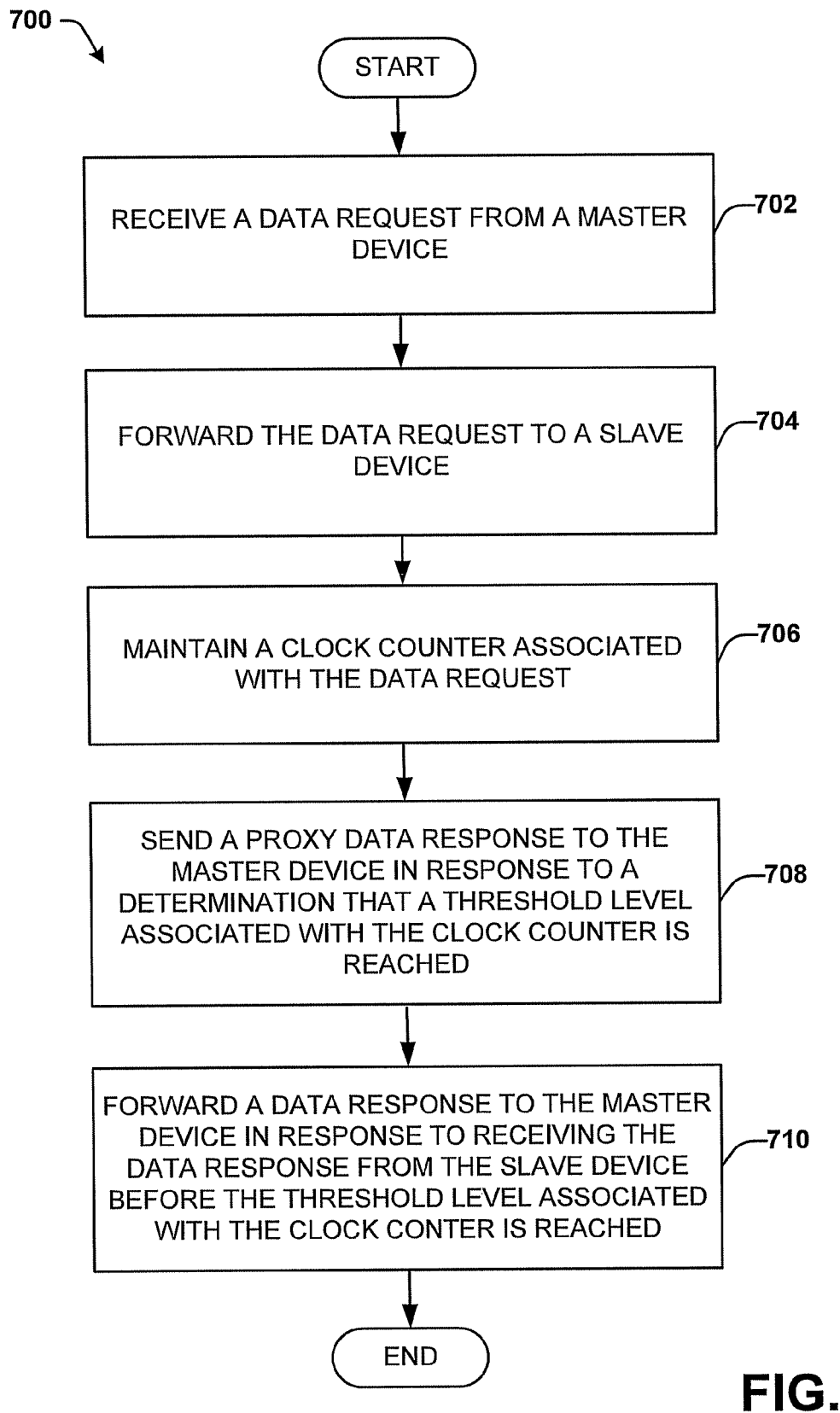
FIG. 7 illustrates a flow diagram of an example, non-limiting embodiment of a method for implementing data transactions in connection with a slave shim interconnect in accordance with various aspects described herein.

Referring to FIG. 7, a flow diagram of an example, non-limiting embodiment of a method for implementing data transactions in connection with a slave shim interconnect is shown. Method 700 can begin at block 702, where a data request is received (e.g., by an interface component 108) from a master device. At block 704, the data request is forwarded (e.g., by an interface component 108) to a slave device. At block 706, a clock counter associated with the data request is maintained (e.g., by a timeout component 110).

At block 708, a proxy data response is sent (e.g., by an interface component 108) to the master device in response to a determination that a threshold level associated with the clock counter is reached. For example, a proxy data response can be sent to the master device in response to a determination that a predetermined period of time has passed since the data request is forwarded to the slave device. In an aspect, the proxy data response can be sent to the master device in response to receiving a timeout signal associated with the data request (e.g., a timeout signal associated with the data request being generated).

At block 710, a data response is forwarded (e.g., by an interface component 108) to the master device in response to receiving the data response from the slave device before the threshold level associated with the clock counter is reached. For example, a data response generated by the slave device can be forwarded to the master device in response to receiving the data response within the predetermined period of time. In an aspect, the data response generated by the slave device can be forwarded to the master device in response to a determination that a timeout signal associated with the data request has not been generated and/or received.

Figure 8:
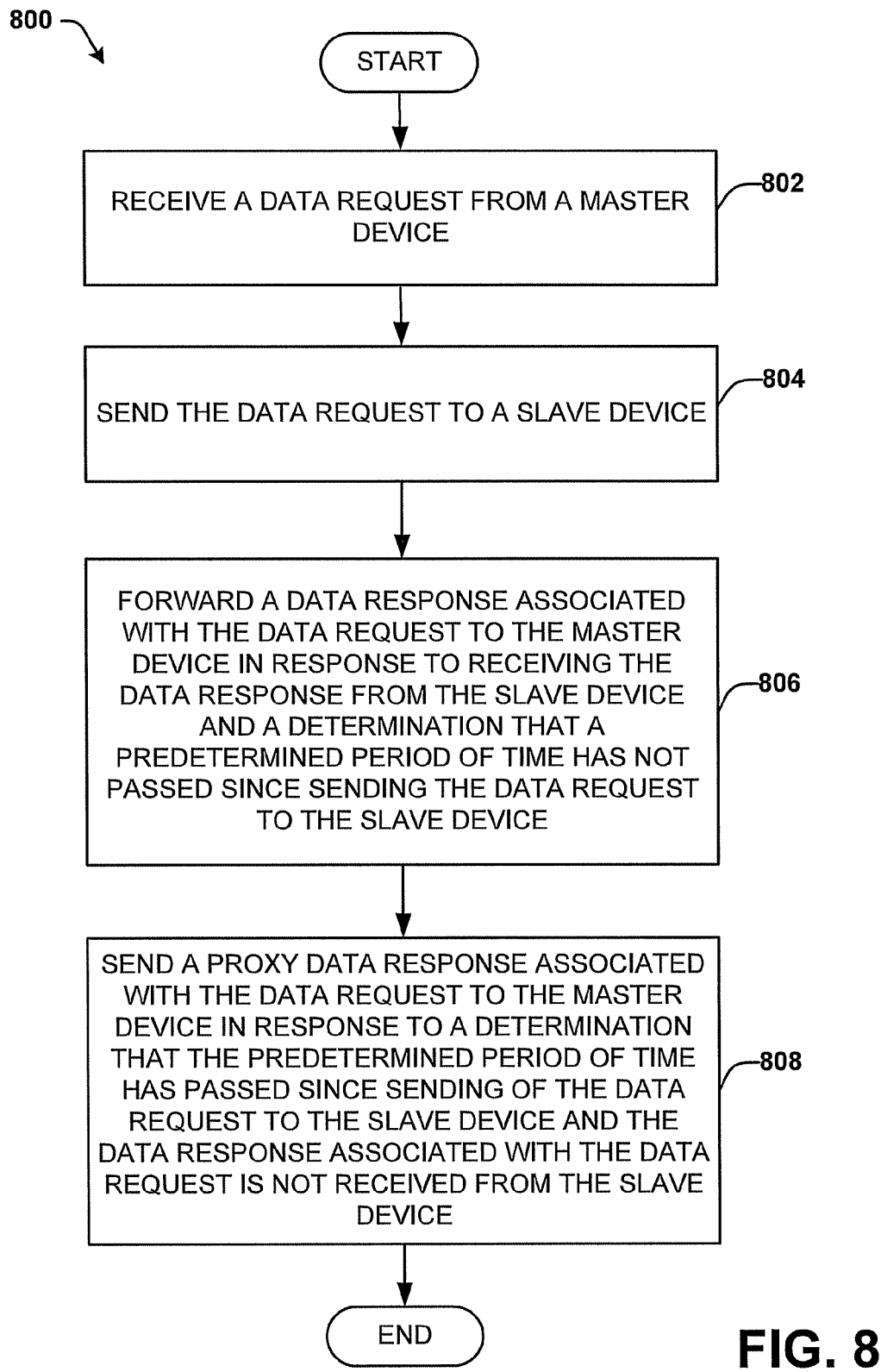
FIG. 8 illustrates a flow diagram of another example, non-limiting embodiment of a method for implementing data transactions in a slave shim interconnect in accordance with various aspects described herein.

Referring to FIG. 8, a flow diagram of another example, non-limiting embodiment of a method for implementing data transactions in a slave shim interconnect is shown. Method 800 can begin at block 802, where a data request is received (e.g., by a slave shim interconnect 102) from a master device. At block 804, the data request is sent (e.g., by a slave shim interconnect 102) to a slave device. At block 806, a data response associated with the data request is forwarded (e.g., by a slave shim interconnect 102) to the master device in response to receiving the data response from a slave device and a determination that a predetermined period of time has not passed since sending the data request to a slave device. For example, a data response associated with the data request can be forwarded to the master device in response to receiving the data response from a slave device before a clock counter associated with the data request reaches a predetermined threshold value and/or a timeout signal associated with the data request is generated. At block 808, a proxy data response associated with the data request is sent (e.g., by a slave shim interconnect 102) to the master device in response to a determination that the predetermined period of time has passed since sending the data request to the slave device and the data response associated with the data request is not received from the slave device. For example, a proxy data response associated with the data request can be sent to the master device in response to not receiving the data response from a slave device before a clock counter associated with the data request reaches a predetermined threshold value and/or a timeout signal associated with the data request is generated.

Figure 9:
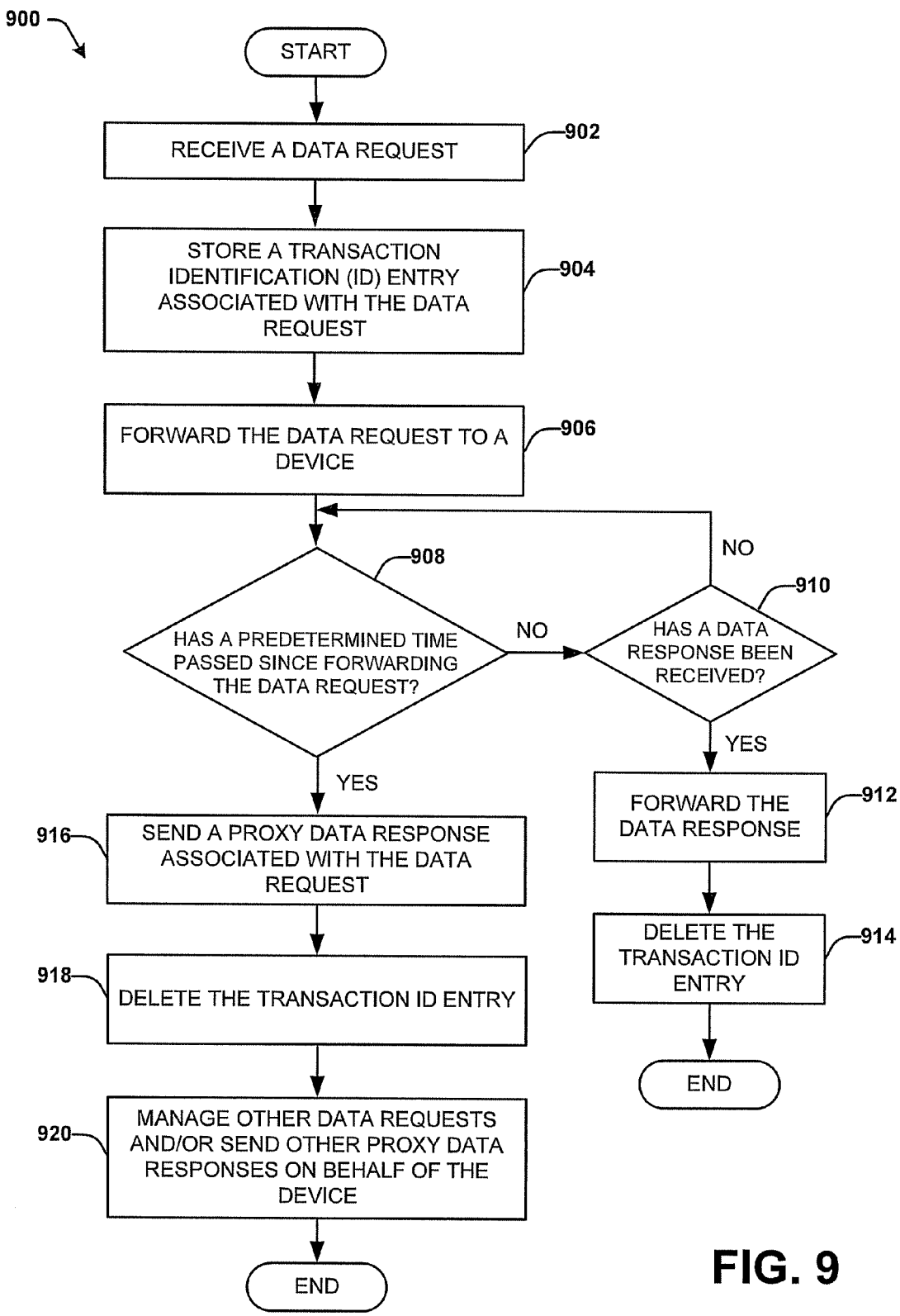
FIG. 9 illustrates a flow diagram of yet another example, non-limiting embodiment of a method for implementing data transactions in a slave shim interconnect in accordance with various aspects described herein.

Referring to FIG. 9, a flow diagram of yet another example, non-limiting embodiment of a method for implementing data transactions in a slave shim interconnect is shown. Method 900 can begin at block 902, where a data request is received (e.g., by an interface component 108). For example, the data request can be received from a master device. In one example, a write request can be received from a master device. In another example, a read request can be received from a master device. In an aspect, the data request can be received as a single data request from the master device. In another aspect, the data request can be included in a group of data requests received from the master device.

At block 904, a transaction ID entry associated with the data request is stored (e.g., by an interface component 108 and/or a transaction ID component 202). For example, the transaction ID entry associated with the data request can be stored in a linked list data structure. In an aspect, the linked list data structure can be associated with at least one FIFO memory.

At block 906, the data request is forwarded (e.g., by an interface component 108) to a device. For example, the data request can be forwarded to a slave device.

At block 908, it is determined (e.g., by a timeout component 110) whether a predetermined time period has passed since forwarding the data request. For example, it can be determined whether a clock counter associated with the data request (e.g., started in response to forwarding the data request) has reached a predetermined threshold level.

If no, method proceeds to block 910. If yes, method 900 proceeds to block 916. At block 910, it is determined whether a data response has been received (e.g., by an interface component 108 and/or an order component 204). For example, it can be determined whether a data response associated with the data request has been received from the device (e.g., the slave device). If yes, method 900 proceeds to block 912. If no, method 900 returns to block 908. At block 912, the data response is forwarded (e.g., by an interface component 108 and/or an order component 204). For example, the data response received from the device (e.g., the slave device) can be forwarded to another device (e.g., the master device). At block 914, the transaction ID entry is deleted (e.g., by an interface component 108 and/or an order component 204). For example, the transaction ID entry associated with the data request can be deleted. In one example, the linked list data structure can be updated to account for the forwarding of the data response associated with the data request. After block 914, method 900 can end.

At block 916, a proxy data response associated with the data request is sent (e.g., by an interface component 108 and/or an order component 204). For example, a proxy data response can be sent on behalf of the device (e.g., the slave device).

At block 918, the transaction ID entry is deleted (e.g., by an interface component 108 and/or an order component 204). For example, the transaction ID entry associated with the data request can be deleted. In one example, the linked list data structure can be updated to account for the sending of the proxy data response associated with the data request.

At block 920, other data requests are managed and/or other proxy data responses are sent on behalf of the device (e.g., by an interface component 108 and/or an order component 204). For example, proxy data responses can be sent to other devices (e.g., one or more master devices) for future data requests associated with the device (e.g., the slave device).

Figure 10:
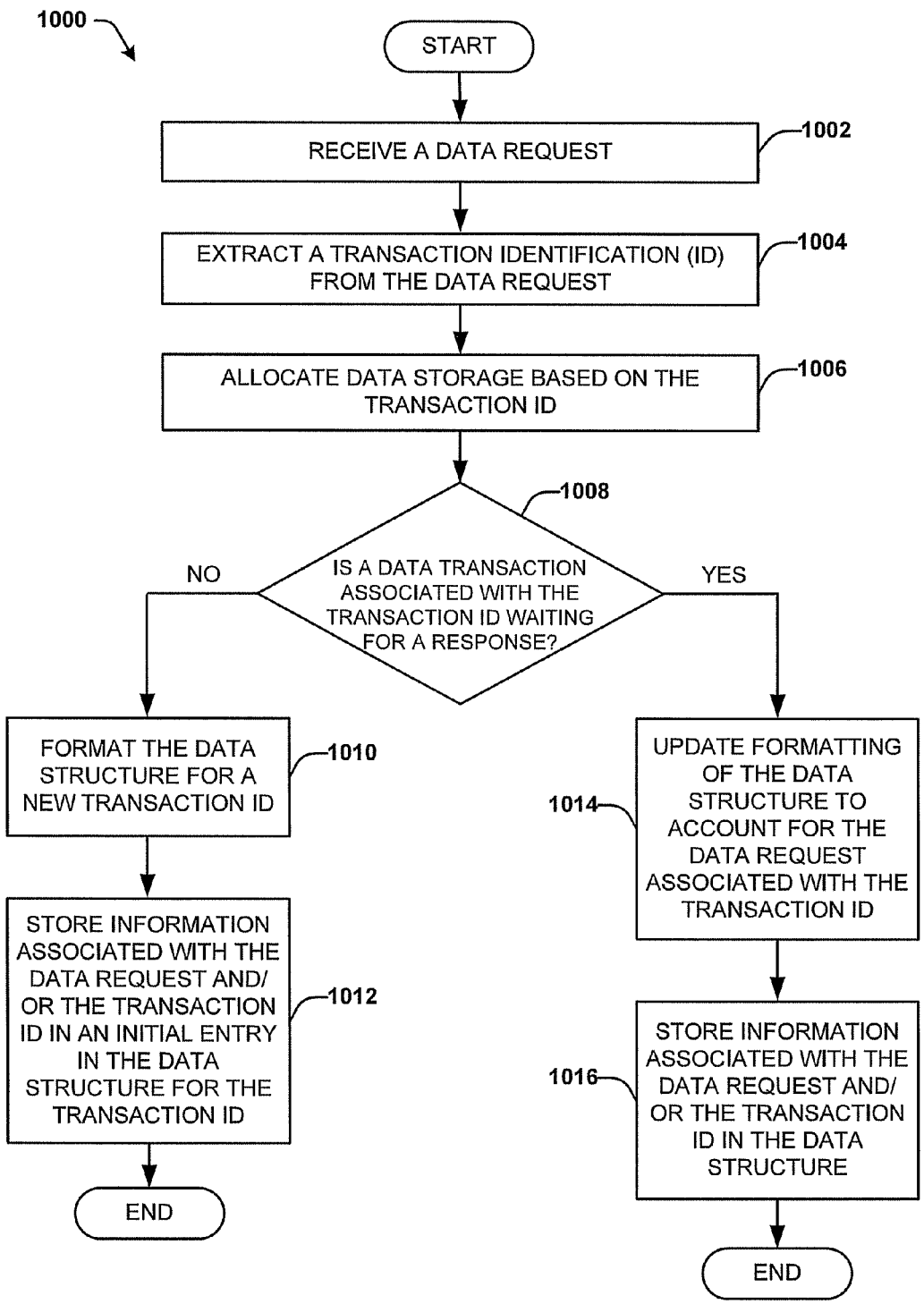
FIG. 10 illustrates a flow diagram of an example, non-limiting embodiment of a method for processing a data request in accordance with various aspects described herein.

Referring to FIG. 10, a flow diagram of an example, non-limiting embodiment of a method for processing a data request is shown. Method 1000 can begin at block 1002, where a data request is received (e.g., by a slave shim interconnect 102). For example, a data request can be received from a master device.

At block 1004, a transaction identification (ID) is extracted from the data request (e.g., by a slave shim interconnect 102). For example, a transaction ID associated with the data request can be determined.

At block 1006, data storage is allocated based on the transaction ID (e.g., by a slave shim interconnect 102). In one example, the data storage can be associated with a linked list data structure. In another example, the data storage can be associated with a FIFO memory.

At block 1008, it is determined (e.g., by a slave shim interconnect 102) whether a data transaction associated with the transaction ID is waiting for a response. For example, it can be determined whether the transaction ID (e.g., an entry associated with the transaction ID) is already stored in the data storage for a previous data request.

If no, method 1000 proceeds to block 1010. At block 1010, the data structure is formatted (e.g., by a slave shim interconnect 102) for a new transaction ID. For example, the data structure can be formatted to account for the transaction ID being a new transaction ID (e.g., a transaction ID that is not already stored in the data storage). At block 1012, information associated with the data request and/or the transaction ID is stored in an initial entry in the data structure for the transaction ID (e.g., by a slave shim interconnect 102). For example, information associated with the data request and/or the transaction ID can be stored in an initial entry for a new data list (e.g., a new data list of a linked list data structure) associated with the transaction ID. After block 1012, methodology 1000 can end.

If yes, method 1000 proceeds to block 1014. At block 1014, formatting of the data structure is updated (e.g., by a slave shim interconnect 102) to account for the data request associated with the transaction ID. For example, an entry for the linked list data structure (e.g., an entry associated with the transaction ID) can be updated so that the data request is associated with other data requests related to the transaction ID (e.g., other data requests associated with the transaction ID that are already stored in the data storage). In an aspect, an order for processing data requests associated with the transaction ID can be updated to account for the data request. At block 1016, information associated with the data request and/or the transaction ID is stored in the data structure (e.g., by a slave shim interconnect 102). For example, information associated with the data request and/or the transaction ID can be stored in a new entry for a data list (e.g., a data list of a linked list data structure) associated with the transaction ID. After block 1016, methodology 1000 can end.

Figure 11:
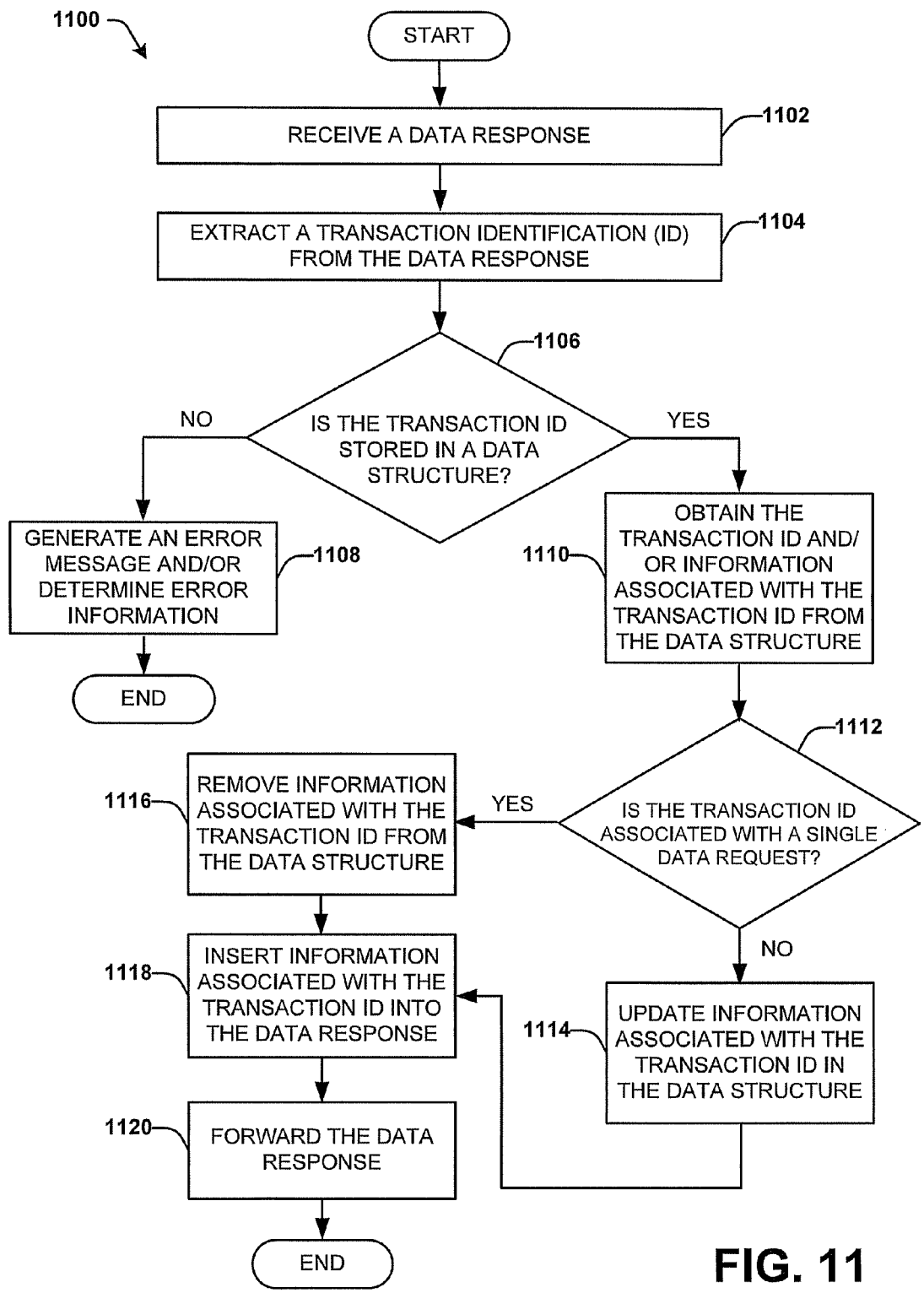
FIG. 11 illustrates a flow diagram of an example, non-limiting embodiment of a method for processing a data response in accordance with various aspects described herein.

Referring to FIG. 11, a flow diagram of an example, non-limiting embodiment of a method for processing a data response is shown. Method 1100 can begin at block 1102, where a data response is received (e.g., by a slave shim interconnect 102). In example, the data response can be received from a slave device. In another example, the data response can be a proxy data response generated by a slave shim interconnect.

At block 1104, a transaction ID is extracted from the data response (e.g., by a slave shim interconnect 102). For example, a transaction ID associated with the data response can be determined.

At block 1106, it is determined (e.g., by a slave shim interconnect 102) whether the transaction ID is stored in a data structure. For example, it can be determined whether an entry for a data request associated with the transaction ID is stored in the data structure (e.g., whether a data request associated with the transaction ID has been received).

If no, method 1100 proceeds to block 1108. At block 1108, an error message is generated and/or error information is determined (e.g., by a slave shim interconnect 102). For example, an error message associated with the data response can be generated and/or error information associated with the data response can be determined. After block 1108, method 1100 can end.

If yes, method 1100 proceeds to block 1110. At block 1110, the transaction ID and/or information associated with the transaction ID is obtained from the data structure (e.g., by a slave shim interconnect 102). For example, an entry for the transaction ID can be found in the data structure. Furthermore, information associated with the transaction ID and/or a data request associated with the data response can be obtained.

At block 1112, it is determined (e.g., by a slave shim interconnect 102) whether the transaction ID is associated with a single data request. For example, it can be determined whether only one entry for the transaction ID is stored in the data structure.

If no, method 1100 proceeds to block 1114. At block 1114, information associated with the transaction ID is updated in the data structure (e.g., by a slave shim interconnect 102). For example, an entry in a data list associated with the transaction ID (e.g., a data list in a linked list structure) can be deleted. After block 1114, method 1100 can proceed to block 1118.

If yes, method 1100 proceeds to block 1116. At block 1116, information associated with the transaction ID is removed from the data structure (e.g., by a slave shim interconnect 102). For example, a data list associated with the transaction ID (e.g., a data list in a linked list structure) can be deleted. After block 1116, method 1100 can proceed to block 1118.

At block 1118, information associated with the transaction ID is inserted into the data response (e.g., by a slave shim interconnect 102). For example, the transaction ID and/or other information associated with the transaction ID can be appended to the data response.

At block 1120, the data response is forwarded (e.g., by a slave shim interconnect 102). For example, the data response can be forwarded to a master device that transmitted a data request associated with the data response.

Example Computing Environment

Figure 12:
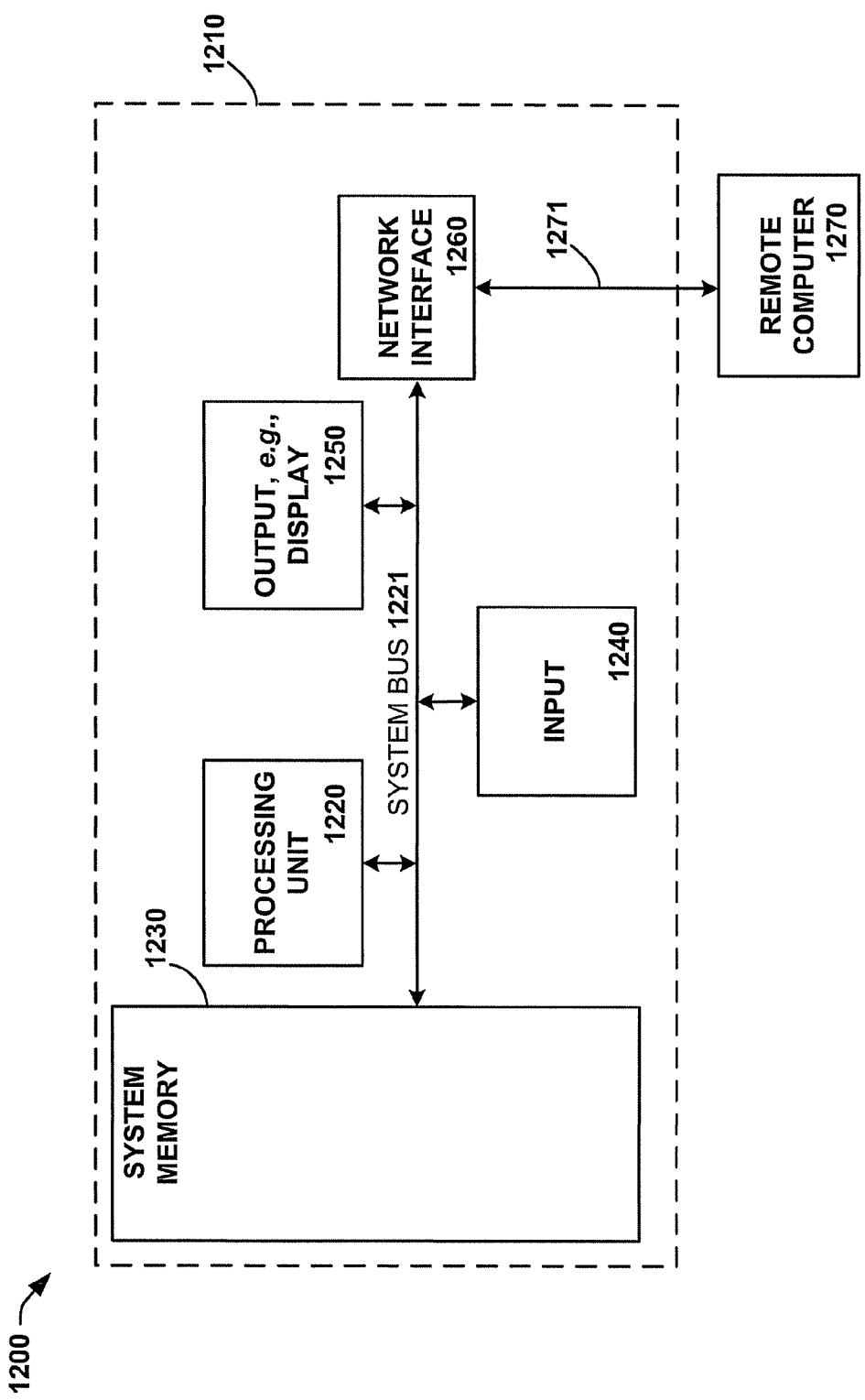
FIG. 12 illustrates a block diagram of an example electronic computing environment that can be implemented in conjunction with one or more aspects described herein.

As mentioned, advantageously, the techniques described herein can be applied to any device where it is desirable to generate a timeout signal based on a clock counter associated with a data request. It is to be understood, therefore, that handheld, portable and other computing devices and computing objects of all kinds are contemplated for use in connection with the various non-limiting embodiments, i.e., anywhere that a device may wish to generate a timeout signal based on a clock counter associated with a data request. Accordingly, the below general purpose remote computer described below in FIG. 12 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 12 thus illustrates an example of a suitable computing system environment 1200 in which some aspects of the disclosed subject matter can be implemented, although as made clear above, the computing system environment 1200 is only one example of a suitable computing environment for a device and is not intended to suggest any limitation as to the scope of use or functionality of the disclosed subject matter. Neither should the computing environment 1200 be interpreted as having any dependency or requirement relating to any one or combination of components illustrated in the exemplary operating environment 1200.

With reference to FIG. 12, an exemplary device for implementing the disclosed subject matter includes a general-purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules, or other data in a modulated data signal such as a carrier wave or other transport mechanism and includes any information delivery media.

The system memory 1230 may include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, may be stored in memory 1230. Memory 1230 typically also contains data and/or program modules that are immediately accessible to and/or presently being operated on by processing unit 1220. By way of example, and not limitation, memory 1230 may also include an operating system, application programs, other program modules, and program data.

The computer 1210 may also include other removable/non-removable, volatile/nonvolatile computer storage media. For example, computer 1210 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1221 through a non-removable memory interface such as an interface, and a magnetic disk drive or optical disk drive is typically connected to the system bus 1221 by a removable memory interface, such as an interface.

A user can enter commands and information into the computer 1210 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1220 through user input 1240 and associated interface(s) that are coupled to the system bus 1221, but may be connected by other interface and bus structures, such as a parallel port, game port, or a universal serial bus (USB). A graphics subsystem can also be connected to the system bus 1221. A projection unit in a projection display device, or a HUD in a viewing device or other type of display device can also be connected to the system bus 1221 via an interface, such as output interface 1250, which may in turn communicate with video memory. In addition to a monitor, computers can also include other peripheral output devices such as speakers which can be connected through output interface 1250.

The computer 1210 can operate in a networked or distributed environment using logical connections to one or more other remote computer(s), such as remote computer 1270, which can in turn have media capabilities different from device 1210. The remote computer 1270 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1210. The logical connections depicted in FIG. 12 include a network 1271, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1210 can be connected to the LAN 1271 through a network interface or adapter. When used in a WAN networking environment, the computer 1210 can typically include a communications component, such as a modem, or other means for establishing communications over the WAN, such as the Internet. A communications component, such as wireless communications component, a modem and so on, which can be internal or external, can be connected to the system bus 1221 via the user input interface of input 1240, or other appropriate mechanism. In a networked environment, program modules depicted relative to the computer 1210, or portions thereof, can be stored in a remote memory storage device. It will be appreciated that the network connections shown and described are exemplary and other means of establishing a communications link between the computers can be used.

Example Networking Environment

Figure 13:
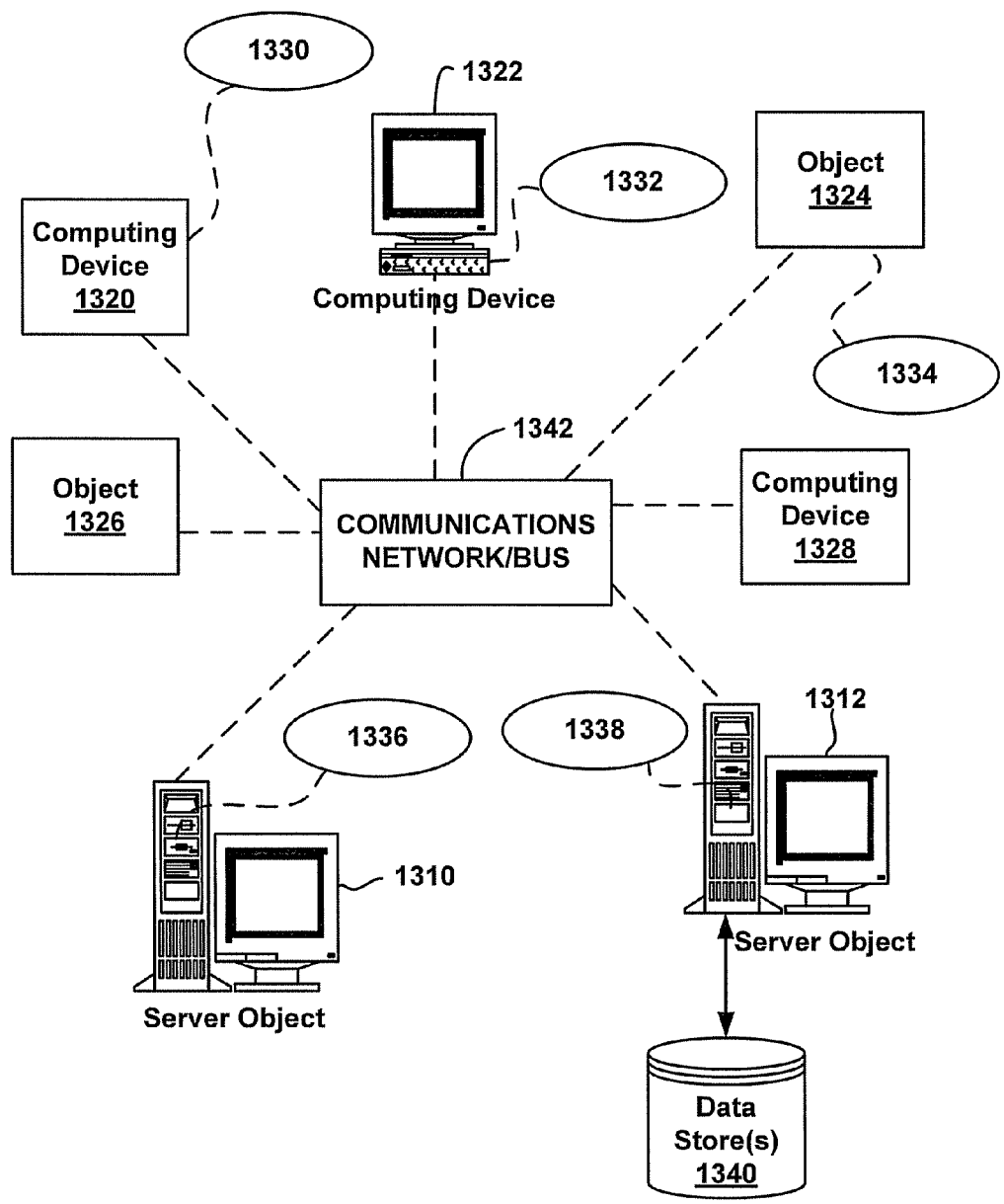
FIG. 13 illustrates a block diagram of an example data communication network that can be operable in conjunction with various aspects described herein.

FIG. 13 provides a schematic diagram of an exemplary networked or distributed computing environment. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338 and data store(s) 1340. It can be appreciated that computing objects 1310, 1312, etc. and computing objects or devices 1320, 1322, 1324, 1326, 1328, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1340 can include a memory, a data structure and/or other similar data stores disclosed herein.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1342, either directly or indirectly. Even though illustrated as a single element in FIG. 13, communications network 1342 may comprise other computing objects and computing devices that provide services to the system of FIG. 13, and/or may represent multiple interconnected networks, which are not shown. Each computing object 1310, 1312, etc. or computing object or devices 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications for transmitting and/or receiving data transactions, generating a timeout signal based on a clock counter associated with a data request, etc. as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc., acting as servers provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1342 or bus is the Internet, for example, the computing objects 1310, 1312, etc. can be Web servers with which other computing objects or devices 1320, 1322, 1324, 1326, 1328, etc. communicate via any of a number of known protocols, such as the hypertext transfer protocol (HTTP). Computing objects 1310, 1312, etc. acting as servers may also serve as clients, e.g., computing objects or devices 1320, 1322, 1324, 1326, 1328, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
    a memory storing computer executable components; and
    a processor operably connected to the memory and configured to execute the computer executable components comprising:
        an interface component configured for receiving a data request from a master device and forwarding the data request to a slave device; and
        a timeout component configured for maintaining a clock counter associated with the data request and, in response to a determination that a threshold level associated with the clock counter is reached before receiving a data response associated with the data request from the slave device, generating a timeout signal to facilitate a proxy data response for that data request.

2. The system of claim 1, wherein the threshold level corresponds to a predetermined period of time since the forwarding of the data request.

3. The system of claim 1, wherein the interface component is configured for sending the proxy data response to the master device in response to receiving the timeout signal from the timeout component.

4. The system of claim 1, wherein the interface component is configured for forwarding the data response associated with the data request to the master device in response to receiving the data response from the slave device and not receiving the timeout signal from the timeout component.

5. The system of claim 3, wherein the interface component is further configured for managing one or more other data transactions associated with the slave device in response to the receiving the timeout signal from the timeout component.

6. The system of claim 3, wherein the interface component is further configured for storing a transaction identification (ID) associated with the data request.

7. The system of claim 6, wherein the interface component is further configured for associating the transaction ID with the proxy data response.

8. The system of claim 7, wherein the interface component is further configured for deleting an entry associated with the transaction ID in response to the sending of the proxy data response.

9. The system of claim 7, wherein the interface component is further configured for deleting an entry associated with the transaction ID in response to receiving the data response associated with the data request from the slave device.

10. The system of claim 1, further comprising a register component configured for sending one or more data transactions associated with a register related to the slave device after the timeout signal is received from the timeout component.

11. A computer implemented method, comprising:
    receiving a data request in a computer system from a master device;
    forwarding the data request to a slave device in the computer system;
    maintaining a clock counter associated with the data request in the computer system; and
    generating, in response to a determination that a threshold level associated with the clock counter is reached before receiving a data response associated with the data request from the slave device, a proxy data response for the data request in the computer system.

12. The computer implemented method of claim 11, further comprising sending the proxy data response to the master device.

13. The computer implemented method of claim 12, further comprising forwarding the data response associated with the data request to the master device in response to receiving the data response from the slave device and not generating the proxy data response.

14. The computer implemented method of claim 13, further comprising managing one or more other data transactions associated with the slave device in response to the generating the proxy data response.

15. The computer implemented method of claim 13, further comprising storing a transaction identification (ID) associated with the data request.

16. The computer implemented method of claim 15, further comprising associating the transaction ID with the proxy data response.

17. The computer implemented method of claim 15, further comprising deleting an entry associated with the transaction ID in response to the sending of the proxy data response.

18. The computer implemented method of claim 15, further comprising deleting an entry associated with the transaction ID in response to receiving the data response associated with the data request from the slave device.

19. The computer implemented method of claim 11, further comprising sending one or more data transactions associated with a register related to the slave device after the generating the proxy data response.

20. A system, comprising:
    means for receiving a data request from a master device;
    means for forwarding the data request to a slave device;
    means for maintaining a clock counter associated with the data request; and
    means for generating a proxy data response for the data request in response to a determination that a threshold level associated with the clock counter is reached before receiving a data response associated with the data request from the slave device.

* * * * *